United States Patent
Disbrow

(10) Patent No.: US 10,094,493 B2
(45) Date of Patent: Oct. 9, 2018

(54) EXPANDABLE AIR HOSE

(71) Applicant: Don Disbrow, Franklin, NC (US)

(72) Inventor: Don Disbrow, Franklin, NC (US)

( * ) Notice: Subject to any disclaimer, the term of this patent is extended or adjusted under 35 U.S.C. 154(b) by 538 days.

(21) Appl. No.: 14/556,525

(22) Filed: Dec. 1, 2014

(65) Prior Publication Data
US 2015/0152984 A1    Jun. 4, 2015

Related U.S. Application Data

(60) Provisional application No. 61/910,223, filed on Nov. 29, 2013.

(51) Int. Cl.
*F16L 11/00* (2006.01)
*F16L 11/12* (2006.01)
*F16L 11/08* (2006.01)

(52) U.S. Cl.
CPC ............ *F16L 11/12* (2013.01); *F16L 11/085* (2013.01)

(58) Field of Classification Search
CPC ................................ F16L 11/12; F16L 11/085
USPC ................................................... 138/119, 137
See application file for complete search history.

(56) References Cited

U.S. PATENT DOCUMENTS

| | | | | |
|---|---|---|---|---|
| 781,349 A * | 1/1905 | Moore | ........... | D03D 3/00 138/119 |
| 935,086 A * | 9/1909 | Baird | ........... | F16L 11/10 138/119 |
| 1,053,933 A * | 2/1913 | Stowe | ........... | F16L 11/10 138/119 |
| 1,164,303 A * | 12/1915 | Nicewarner | ........... | F16L 11/10 138/119 |
| 2,329,826 A | 9/1943 | Huthsing | | |
| 2,329,836 A * | 9/1943 | Huthsing | ........... | B29D 23/001 138/119 |
| 2,598,002 A | 5/1952 | Smith | | |
| 2,598,022 A * | 5/1952 | Smith | ........... | B29D 23/001 138/119 |
| 3,021,871 A | 2/1962 | Rodgers | | |
| 3,374,806 A * | 3/1968 | Skinner | ........... | F16L 11/121 138/119 |
| 3,581,778 A * | 6/1971 | Korejwa | ........... | B29C 47/02 138/119 |
| 3,826,288 A | 7/1974 | Cooper | | |
| 4,009,734 A | 3/1977 | Sullivan | | |

(Continued)

*Primary Examiner* — Vishal Pancholi
(74) *Attorney, Agent, or Firm* — Nexsen Pruet, LLC; John B. Hardaway, III

(57) ABSTRACT

The present invention provided an air hose that is configured to be used in conjunction with an air compressor. The air hose includes a tube portion having open proximal and distal ends. The tube portion includes a flat upper portion and lower portion connected at their ends to a pair of rounded shoulders that give the tube portion a substantially rectangular cross section in a collapsed state. The hose further includes radial plies that extend within the cross section across the upper, lower portions, and around the rounded shoulders. The radial plies bias the upper and lower portions together into a collapsed state, wherein the upper and lower portions are parallel and substantially in contact with one another. The upper and lower portions expand from a collapsed state to an expanded state when compressed air is forced therethrough giving the tube portion a substantially rounded cross section.

9 Claims, 2 Drawing Sheets

(56) References Cited

U.S. PATENT DOCUMENTS

| | | | |
|---|---|---|---|
| 4,467,837 A * | 8/1984 | Baker | B29C 63/34 |
| | | | 138/119 |
| 4,895,185 A | 1/1990 | Champleboux | |
| 6,523,539 B2 | 2/2003 | McDonald et al. | |
| 6,889,701 B2 | 5/2005 | Kovacik | |
| 6,948,527 B2 | 9/2005 | Ragner et al. | |
| 6,955,189 B1 * | 10/2005 | Weyker | F16L 11/121 |
| | | | 138/104 |
| 7,549,448 B2 | 6/2009 | Ragner | |
| 7,592,544 B2 | 9/2009 | Carscallen, II | |
| 8,291,941 B1 | 10/2012 | Berardi | |
| 8,291,942 B2 | 10/2012 | Berardi | |
| 8,479,776 B2 | 7/2013 | Berardi | |
| 8,757,213 B2 | 6/2014 | Berardi | |
| D719,244 S | 12/2014 | Yang | |
| 8,936,046 B2 | 1/2015 | Ragner | |
| D723,669 S | 3/2015 | Berardi | |
| 9,022,076 B2 | 5/2015 | Ragner et al. | |
| D731,032 S | 6/2015 | Yang | |
| 9,074,711 B2 | 7/2015 | Huang | |
| 9,127,791 B2 | 9/2015 | Ragner | |
| 2004/0124287 A1 | 7/2004 | Pianetto | |
| 2005/0115622 A1 * | 6/2005 | Bennett | F16L 11/121 |
| | | | 138/119 |
| 2006/0070679 A1 | 4/2006 | Ranger | |
| 2012/0234425 A1 | 9/2012 | Berardi | |
| 2013/0087205 A1 | 4/2013 | Berandi | |
| 2013/0180615 A1 | 7/2013 | Ranger | |

\* cited by examiner

EXPANDABLE AIR HOSE

CROSS REFERENCE TO RELATED APPLICATION

This application claims the benefit of U.S. Provisional Application No. 61/910,223 filed on Nov. 29, 2013. The above identified patent application is herein incorporated by reference in its entirety to provide continuity of disclosure.

BACKGROUND OF THE INVENTION

Field of the Invention

The present invention relates to hoses. More specifically, the present invention pertains to an improved air hose that is utilized in conjunction with an air compressor and a variety of pneumatic tools such as blow guns, nail guns, and air staplers. The present invention includes a tube portion having a flat upper portion and a flat lower portion connected at their ends by a pair of rounded shoulder to give the tube portion a substantially rectangular cross section. The shoulders allow the flat upper and lower portions to expand from a collapsed rest state to a rounded state.

An air compressor is a device that converts power from a motor or engine into energy to compress air. The compressed air is generally contained within a pressure vessel, and the release of the compressed air can be triggered in quick bursts. Two of the most common uses for an air compressor are inflation and pneumatic tools. An inflation attachment includes a nozzle that allows one to inflate everything from beach balls to automobile tires. Pneumatic tools are generally faster, lighter and more powerful than traditional power tools. Some pneumatic tools that are useful with an air compressor include: a blown gun, a nail gun, an air stapler, and a spray gun.

An air compressor is usually attached to a pneumatic tool by an elongated air hose. However, these hoses can be bulky and cumbersome to work with. Such elongated hoses can be easily tangled and frustrating to unwind and rewind neatly for each use. A traditional hose also may require significant storage space. Therefore, there exists a need for an improved air hose that is compact and configured for use with air compressors.

The present invention provides an air hose that is configured to be removably coupled with an air compressor on one end, and secured to a pneumatic tool or attachment on the other end. The air hose includes a tube portion with open proximal and distal ends having couplers for removably coupling an air compressor and pneumatic tool, respectively. The tube portion comprises a flat upper portion and flat lower portion connected at their ends to a pair of rounded shoulders. The upper and lower portions are parallel and coextensive such that the tube portion has a substantially rectangular cross section in a collapsed state. The hose further includes radial plies that extend within the cross section of the hose, across the upper portion and the lower portion, and around the shoulders. The radial plies bias the upper and lower portions into a collapsed state under normal conditions. When pressurized by compressed air, the hose expands into an expanded state, wherein the cross section is substantially rounded as the compressed air is forced therethrough. The flat upper portion and lower portion return to the collapsed state when compressed air is not pressurizing the hose.

Description of the Prior Art

Devices have been disclosed in the prior art that relate to hoses. These include devices that have been patented and published in patent application publications. Devices in the art include those that expand longitudinally and laterally upon the application of fluid pressure. Other devices include a hose for fluids having an inner tube member made from elastic material and an outer tube member made from a non-elastic material. These prior art devices, however, do not disclose a hose utilized with an air compressor and having the structure of the present invention such that the hose remains in a flattened state. The foregoing is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 8,291,942 to Berardi discloses a hose that expands longitudinally and laterally upon the application of fluid pressure. The Berardi device can expand longitudinally up to six times its contracted length. The Berardi device discloses an inner tube made from elastic material and an outer tube made from non-elastic material. The inner tube is positioned concentrically within the outer tube secured by the first end and second end of both inner and outer tubes. However, the Berardi device does not contemplate the expanding structure of the present invention when the hose is utilized with compressed air.

Similarly, Published U.S. Patent Application Number 2013/0087205 to Berardi discloses a hose having an inner tube member made from elastic material and an outer tube member made from a non-elastic material. The inner tube member is secured to the outer tube at the ends by an inlet coupler and an outlet coupler. The inlet coupler is adapted to secure to a water supply and the outlet coupler is coupled to a flow restrictor allowing the inner tube to equalize in pressure with water received from water supply. Water expands the inner tube longitudinally and laterally. However, the Berardi device discloses a hose for water and does not contemplate a hose utilized with an air compressor and a pneumatic tool.

U.S. Pat. No. 4,895,185 to Champleboux discloses a flexible hose and expandable hose for utilization in fields. The Champleboux device discloses a hose including at least two pairs of adjacent reinforcing layers made of flexible cables disposed helically and attached to at least one rigid end piece. Rigid end piece include an inner supporting element and an outer gripping element. Inner supporting element and outer gripping element are coaxial and having conical compression surfaces, which diverge toward said at least one end. However, the Champleboux device discloses a hose for well packers, and does not contemplate an expandable air hose that has a collapsed resting state.

Finally, U.S. Pat. No. 6,889,701 to Kovacik discloses a reel for storing an air hose having a spring-loaded pulley system mounted therein. The reel includes a hollow reel housing with a flange mounted thereon exterior of the housing, a pulley rotatably mounted inside the housing. The pulley further includes a nozzle mounted thereon. A reel hose is wound on the pulley with one end attached to the nozzle. However, the Kovacik device discloses a hose reel, and does not disclose an air hose.

The devices disclosed in the prior art have several known drawbacks. These devices are limited as they are not adapted for use with an air compressor. One invention discloses a hose that expands longitudinally and laterally upon the application of fluid pressure. Another invention discloses a hose for fluids having an inner tube member made from elastic material and an outer tube member made from a non-elastic material. The present invention overcomes these limitations by disclosing an expandable air hose has a collapsed and flattened rest state and an expanded state when the hose is pressurized therethrough.

The present invention provides an expandable air hose configured to couple with an air compressor and a pneumatic tool. The expandable air hose comprises a tube portion having open proximal and distal ends with couplers attached thereon. The tube portion comprises a flat upper portion and a flat lower portion integrally formed with a pair of rounded shoulders at their ends. Within the cross section of the hose, radial plies that extend across the upper portion and the lower portion, and around the shoulders to bias the upper and lower portions into a substantially rectangular cross section in a collapsed state. The upper and lower portions are substantially in contact with one another in the collapsed state. The hose expands to an expanded state with a substantially circular cross section when the hose is pressurized by compressed air. The flat upper portion and lower portion return to the collapsed state when compressed air is not pressurized therethrough.

SUMMARY OF THE INVENTION

In view of the foregoing disadvantages inherent in the known types of air hoses now present in the prior art, the present invention provides a new and improved air hose including a tube portion, which is flat and rectangular in shape when compressed air is not forced therethrough.

It is therefore an object of the invention to provide a new and improved expandable air hose that has all of the advantages of the prior art and none of the disadvantages.

Another object of the present invention is to provide a new and improved expandable air hose that comprises a tube portion having a flat upper portion and flat lower portion connected at their ends to a pair of rounded shoulders that give the tube portion a substantially rectangular cross section.

Yet another object of the present invention is to provide a new and improved expandable air hose that comprises a plurality of radial plies extending within the cross section across the flat upper portion, flat lower portion and the pair of rounded shoulders.

Still yet another object of the present invention is to provide a new and improved expandable air hose wherein the radial plies bias the flat upper portion and lower portion into a collapsed state wherein the upper portion and lower portion are parallel and substantially in contact with one another.

Another object of the present invention is to provide a new and improved expandable air hose wherein flat upper portion and lower portion expand from a collapsed rest state to a rounded state when compressed air is forced therethrough.

A further object of the present invention is to provide a tube portion having an open proximal and distal ends having couplers thereon for removably attachment to a valve of an air compressor and pneumatic tools.

Still yet another object of the present invention is to provide a new and improved expandable air hose that further includes a reel for easy storage.

Another object of the present invention is to provide a new and improved expandable air hose that is not easily tangled and easy to wind and unwind after each use.

Still yet another object of the present invention is to provide a new and improved expandable air hose wherein the device may be readily fabricated from materials that permit relative economy and are commensurate with durability.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein the numeral annotations are provided throughout.

DETAILED DESCRIPTION OF THE INVENTION

Figure 1:
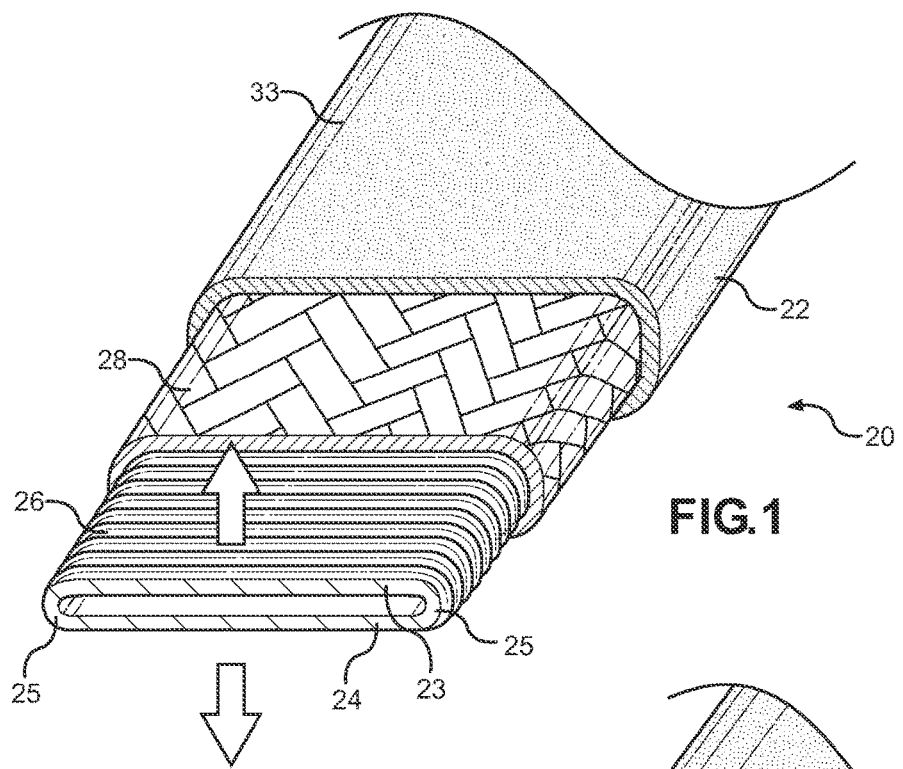
FIG. 1 shows a cross section view of the present invention in the collapsed state.

References are made herein to the attached drawings. Like reference numerals are used throughout the drawings to depict like or similar elements of the expandable air hose. For the purposes of presenting a brief and clear description of the present invention, the preferred embodiment will be discussed as removably attached to an air compressor and a pneumatic tool. The figures are intended for representative purposes only and should not be considered to be limiting in any respect.

Figure 2:
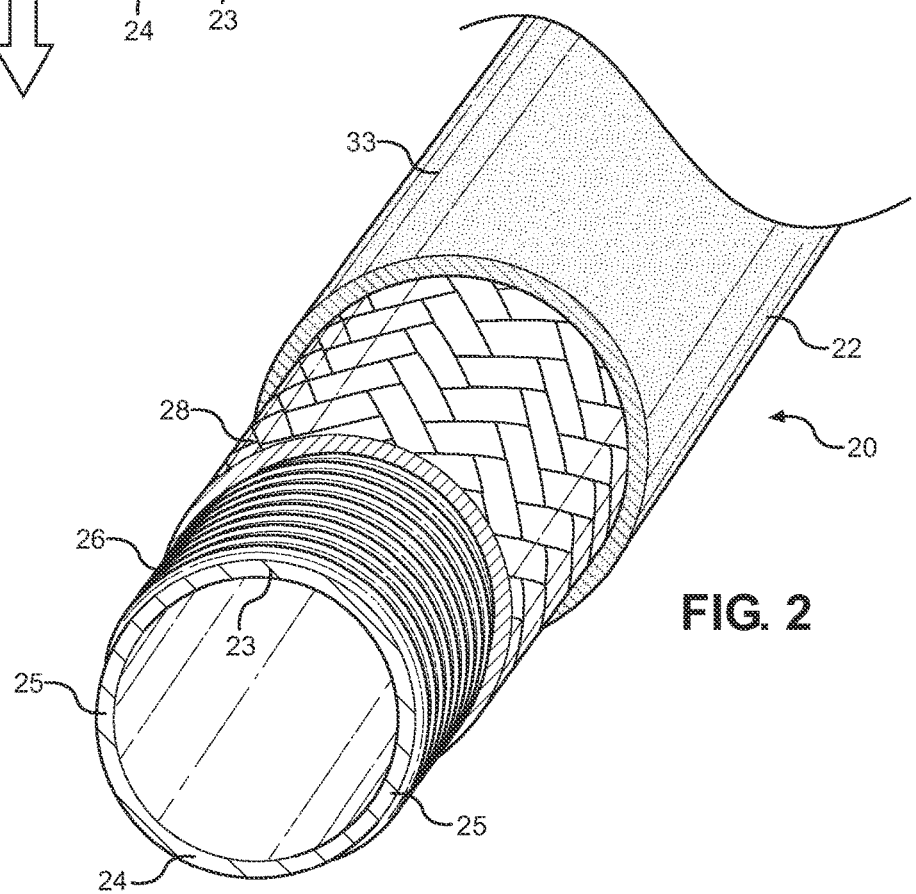
FIG. 2 shows a cross section view of the present invention in the expanded state

Referring now to FIGS. 1 and 2, there are shown cross sections of the expandable air hose 20 in the collapsed state and expanded state. The expandable air hose 20 has a flat construction which prevents air from being forced therethrough. Air hose 20 comprises a tube portion 22 having a flat upper portion 23 and a flat lower portion 24. The flat upper portion 23 and flat lower portion 24 are substantially planar and connected at their ends to a pair of rounded shoulders 25 that give the tube portion 22 a substantially rectangular cross section. Within the cross section, the hose 20 further comprises a plurality of radial plies 26 that extend across the flat upper portion 23, and lower lower portion 24, and around the pair of rounded shoulders 25. The radial plies 26 bias the flat upper portion 23 and flat lower portion 24 together into a collapsed state, wherein the flat upper portion 23 and flat lower portion 24 are substantially coextensive and coplanar. In addition, hose 20 further comprises a rubber coating 33 that encloses and protects the cross section therein.

When compressed air is forced therethrough, the flat upper portion 23 and flat lower portion 24 expand from a collapsed state, wherein the flat upper portion 23 and flat lower portion 24 are substantially in contact with one another in a parallel manner, to an expanded state. The expanded state of tube portion 22 allows the tube portion 22 to inflate into a substantially rounded cross section. The flat upper portion 23 and flat lower portion 24 of the tube portion 22 deflate and return to the collapsed when compressed air is not forced therethrough.

Embedded within the cross section, are radial plies 26, belt plies 28 and metal cords 10. Metal cords 10 run from the proximal end to the distal end longitudinally and maintain the flat shape of the upper portion and lower portion when the hose 20 is not pressurized. Radial plies 26 and belt plies 28 are designed to bias the flat upper portion 23 and flat lower portion 24 of the tube portion 22 together into a collapsed state such that the flat upper portion 23 and flat lower portion 24 are parallel and substantially in contact with one another. However, radial plies 26 are also flexible and durable, wherein the radial plies allow the hose 20 to expand into a cylindrical expanded state without bursting due to excess pressure. The radial plies 26 are radial in nature and run perpendicular to the length of the hose 20. The radial plies 26 constitute the basic skeletal structure of hose 20. Radial plies comprise sheets having polyester cords that are wound together to form sheets. In other embodiments, radial plies 26 are composed of any other suitable fiber cords wound together and embedded within the cross section.

The belt plies 28 run substantially longitudinally along the hose 20 within the cross section. Belt plies 28 comprise steel rectangular sheets with steel cords woven together to form large sheets of braided steel. The belt plies 28 are also flexible and configured to prevent bursting due to excess pressure. In some embodiments, the tube portion 22 may further comprise fibers or steel cords adapted to achieve a better pressure resistance and prevent bursting, such as fibers or steel cords that are reinforced by braiding, spiraling, knitting, and wrapping of fabric plies.

Figure 3:
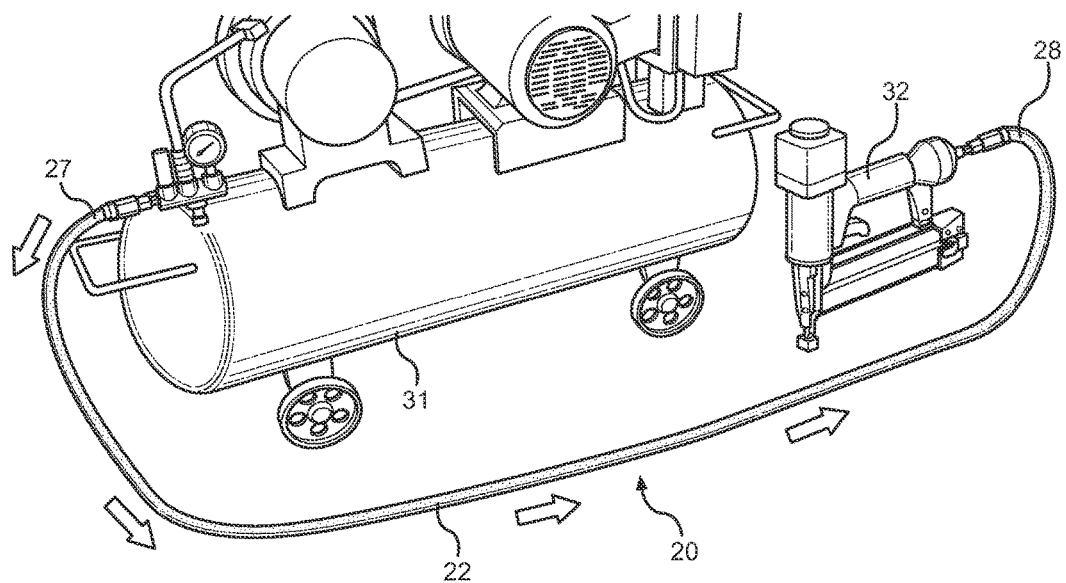
FIG. 3 shows a side perspective of the present invention as removably connected to an air compressor and a pneumatic tool.

Referring now to FIG. 3, there is shown the air hose 20 as removably attached to the valve of an air compressor and a pneumatic tool. The tube portion 22 further comprises a proximal end 27 and a distal end 28. The proximal end 27 comprises a fastener for removably coupling to a valve of an air compressor. The distal end 28 also includes a fastener for removably attachment to a variety of air tools. These tools include, but are not limited to, a blow gun, a nail gun, an air stapler, an air sander, and a spray gun. The tube portion 22, when air is not forced therethrough is substantially flat and rectangular in the collapsed state. However, when air is forced therethrough, the compressed air expands the tube portion 22 laterally into an expanded state allowing the tube portion 22 to take on a cylindrical shape. Fasteners include, but are not limited to quick release fasteners or threaded elements.

The hose 20 is configured to provide air communication from the air compressor 31 to the pneumatic tool 32 therethrough. The air compressor generally has a valve, such as a check valve or ball valve, which is adapted to let compressed air flow from the air compressor out, while blocking air flow in the opposite direction. Compressed air is forced through the tube portion 22 towards the pneumatic tool. The tube portion 22 expands from a flattened shape in the collapsed state to an expanded state taking a more rounded and cylindrical shape with a circular cross section as compressed air is forced therethrough.

As illustrated in FIG. 3, the air compressor 31 comprises one check valve, however, in other larger types of air compressors, a plurality of hoses 20 can be removably coupled to air compressor 31 with each hose 20 also removably coupled to a pneumatic tool. Every pneumatic tool has an operational cubic flow per minute (cfm) requirement, and every type of an air compressor has a maximum cfm output. To operate each tool at maximal efficiency, the cfm output of the air compressor must be greater than the cfm requirement of all pneumatic tools removably coupled to the air compressor.

Figure 4:
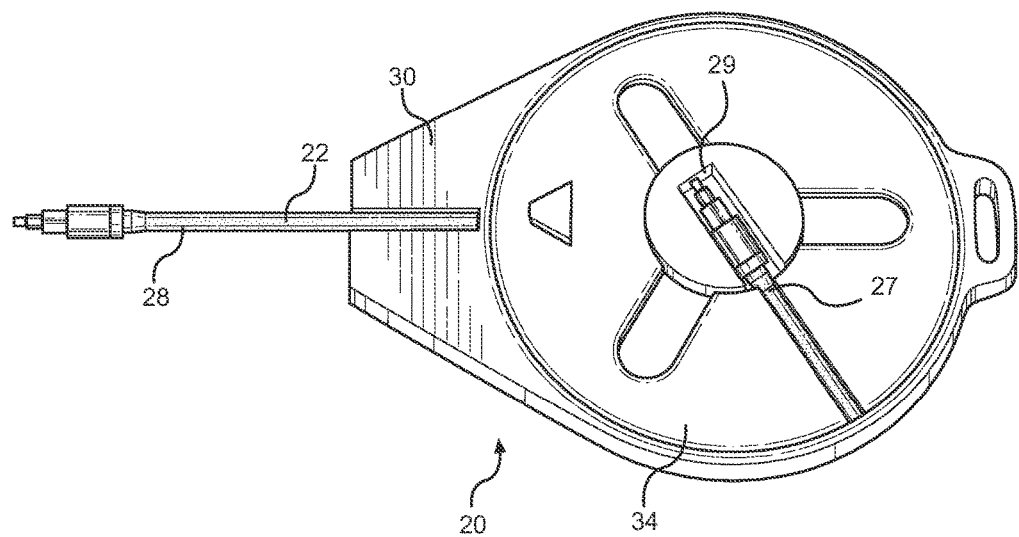
FIG. 4 shows an overhead perspective of the present invention wrapped around a reel.

Referring now to FIG. 4, there is shown the hose 20 as wound on a reel 30. The hose 20 comprises a tube portion 22 with a flat upper portion and a flat lower portion. The flat upper portion and flat lower portion are substantially planar and contacting one another in the collapsed state. The flat upper portion and flat lower portion are connected at their ends to a pair of rounded shoulders that give the tube portion a substantially rectangular cross section. Within the cross section, the hose 20 further comprises a plurality of radial plies that extend across the flat upper portion, and flat lower portion, and around the pair of rounded shoulders. The radial plies are configured to bias the flat upper portion and flat lower portion together into a collapsed state. As the flat upper portion and flat lower portion remains or returns to the collapsed state when compressed air is not forced therethrough, the hose 20 is rotatably wound on a reel 30 in the collapsed state.

The reel 30 is drum-shaped having a cylindrical core and a pair of sidewalls 34. The reel 30 is designed to rotatably wrap the hose 20 around the cylindrical core starting at the proximal end 27. One of the sidewalls 27 further comprises a recess 29 substantially in the center of sidewalls 34. The recess is substantially rectangular prism in shape and sized to provide a snap fit to removably secure the proximal end 27. Other embodiments removably secure the proximal end 27 by a different fit or may further include the use of fasteners. After the proximal end 27 is secured therein, the tube portion 22 is rotatably wound around the cylindrical core until reaching the distal end 28. Other embodiments may further include a clamp that removably secures the distal end 28 to the reel 30. The reel 30 is particularly advantageous as it further prevents the hose 20 from being entangled, and promotes portability, It is therefore submitted that the instant invention has been shown and described in what is considered to be the most practical and preferred embodiments. It is recognized, however, that departures may be made within the scope of the invention and that obvious modifications will occur to a person skilled in the art. With respect to the above descriptions then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An apparatus for operating a pneumatic tool, comprising:
    an air compressor;
    an expandable air hose having a collapsed state and an expanded state;
    said air hose having a proximal end and a distal end;
    said proximal end of said air hose connected to said air compressor for receipt of compressed air;

radial plies comprising polyester cords running perpendicular to the length of said expandable hose;

said distal end of said expandable air hose connected to a pneumatic tool for supplying compressed air thereto;

said expandable air hose being in said collapsed state when said air compressor is not engaged and having said expanded state when said air compressor is engaged to pressurize said expandable hose and cause operation of said pneumatic tool.

2. An apparatus for operating a pneumatic tool, comprising:

an air compressor;

an expandable air hose having a collapsed state and an expanded state;

said air hose having a proximal end and a distal end;

said proximal end of said air hose connected to said air compressor for receipt of compressed air;

belt plies and metal cords that run longitudinally along said expandable hose;

said distal end of said expandable air hose connected to a pneumatic tool for supplying compressed air thereto;

said expandable air hose being in said collapsed state when said air compressor is not engaged and having said expanded state when said air compressor is engaged to pressurize said expandable hose and cause operation of said pneumatic tool.

3. A process for providing compressed air from a compressor to a work tool comprising steps of:

providing an expandable air hose in a collapsed state;

said expandable hose having radial plies comprising polyester cords running perpendicular to the length of said expandable hose;

connecting an end portion of said expandable air hose to an air compressor;

connecting the other end of said expandable air hose to a pneumatic tool;

engaging said air compressor so as to force compressed air into said expandable air hose in a collapsed state thus causing said expandable air hose to expand into an expanded state, said compressed air engaging said pneumatic tool to cause motion therein;

disengaging said air compressor from said expandable hose;

permitting compressed air to escape from said expandable air hose;

causing said expandable hose to collapse and resume said collapsed state.

4. A process for providing compressed air from a compressor to a work tool comprising steps of:

providing an expandable air hose in a collapsed state;

said expandable hose having belt plies and metal cords running longitudinally along said expandable hose;

connecting an end portion of said expandable air hose to an air compressor;

connecting the other end of said expandable air hose to a pneumatic tool;

engaging said air compressor so as to force compressed air into said expandable air hose in a collapsed state thus causing said expandable air hose to expand into an expanded state, said compressed air engaging said pneumatic tool to cause motion therein;

disengaging said air compressor from said expandable hose;

permitting compressed air to escape from said expandable air hose;

causing said expandable hose to collapse and resume said collapsed state.

5. The apparatus according to claim 1, wherein said proximal end and distal end further comprises fasteners;

wherein said proximal end is removably coupled to said air compressor by a fastener and said distal end is removably attached to said pneumatic tool.

6. The apparatus according to claim 1, wherein said belt plies comprise steel rectangular sheets with steel cords woven together to form large sheets of braided steel.

7. The apparatus according to claim 2, wherein said metal cords run from said proximal end to said distal end to maintain the collapsed state of said expandable hose.

8. The apparatus according to claim 2, further comprising a reel having a pair of sidewalls and a cylindrical core;

said pair of sidewalls having a substantially circular shape;

said cylindrical core designed to rotatably wind said hose.

9. The apparatus of claim 8, wherein said reel further comprising a rectangular-shaped recess on said sidewall;

wherein said recess removably attaches said proximal end to said sidewall by snap fit.

\* \* \* \* \*